(No Model.) 2 Sheets—Sheet 1.

W. I. BABCOCK, S. T. & C. H. WELLMAN & J. W. SEAVER.
SHIP BUILDING PLANT.

No. 606,497. Patented June 28, 1898.

Witnesses:
Murray C. Boyer
Hamilton D. Turner

Inventors:
Washington I. Babcock
Samuel T. Wellman
Charles H. Wellman
and John W. Seaver
by their Attorneys,
Howson & Howson

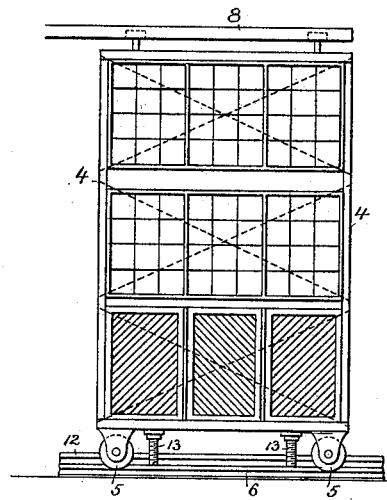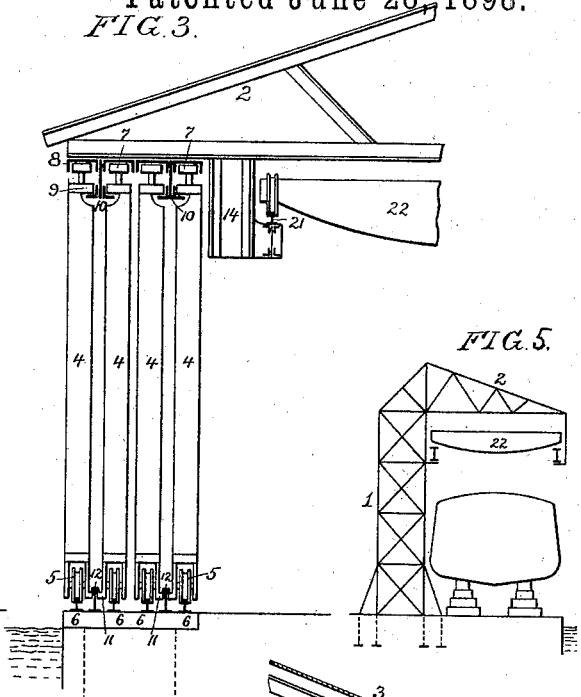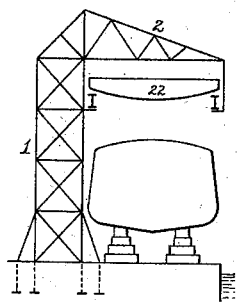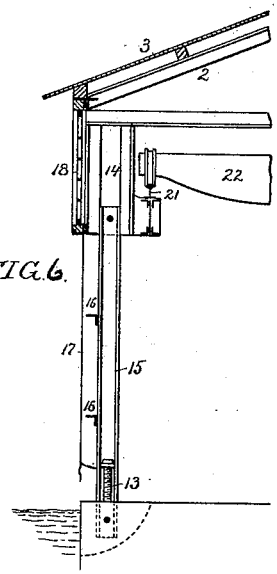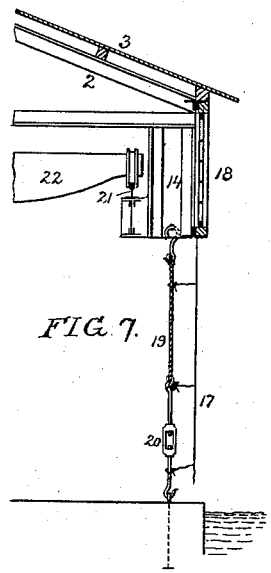

UNITED STATES PATENT OFFICE.

WASHINGTON IRVING BABCOCK, OF CHICAGO, ILLINOIS, AND SAMUEL T. WELLMAN, CHARLES H. WELLMAN, AND JOHN W. SEAVER, OF CLEVELAND, OHIO.

SHIP-BUILDING PLANT.

SPECIFICATION forming part of Letters Patent No. 606,497, dated June 28, 1898.

Application filed April 12, 1897. Serial No. 631,814. (No model.)

*To all whom it may concern:*

Be it known that we, WASHINGTON IRVING BABCOCK, a resident of Chicago, Illinois, and SAMUEL T. WELLMAN, CHARLES H. WELL-MAN, and JOHN W. SEAVER, residents of Cleveland, Ohio, citizens of the United States, have invented certain Improvements in Ship-Building Plants, of which the following is a specification.
The object of our invention is to so construct a certain portion of a ship-building plant as to permit of the carrying on of the work of construction without interruption on account of inclement weather, to facilitate such work of construction, to permit the ship to be readily prepared for launching, and in other ways to reduce the cost of constructing a vessel as compared with the methods now in vogue. These objects we attain in the manner hereinafter set forth, reference being had to the accompanying drawings, in which—

Figure 2:
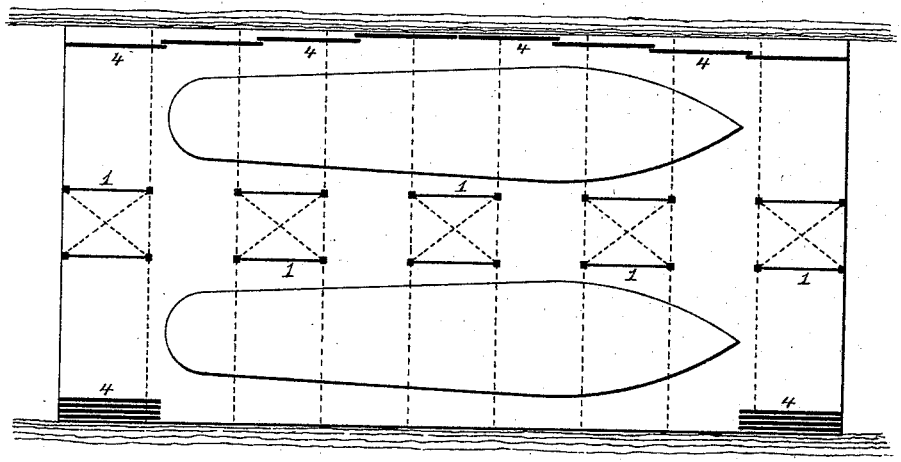
Figure 1:
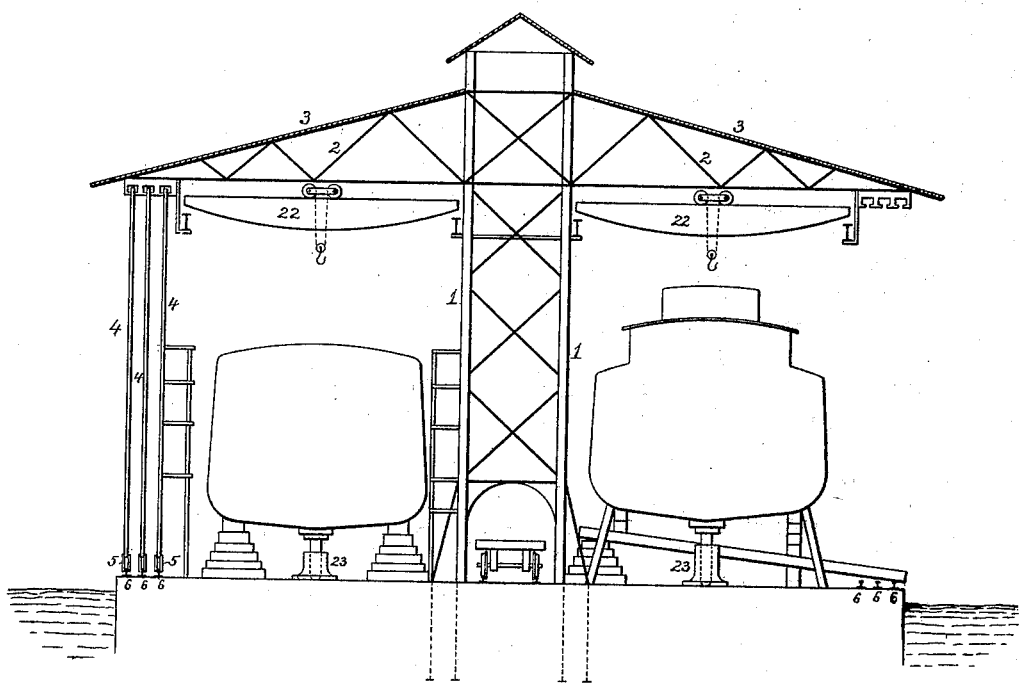

Figure 1 is a transverse sectional view illustrating that portion of a ship-building plant to which our invention relates. Fig. 2 is a sectional plan view of the same on a smaller scale. Figs. 3 and 4 are enlarged views illustrating portions of the structure, and Figs. 5, 6, and 7 are views illustrating modifications.

In times past, when vessels were small, they were sometimes housed during construction, barn-like structures known as "ship-houses" formerly constituting part of the equipment of a government navy-yard; but owing to the great size of modern vessels it has been considered impracticable to inclose them during construction on account of the great expense of any building of a permanent character and of a size large enough to contain a modern vessel with its surrounding scaffoldings and other building appurtenances. It is therefore the practice at present to build vessels in the open air, and in stormy weather it is frequently necessary to entirely suspend operations, not only because of the discomfort to the workmen, but on account of the great danger of walking about on elevated scaffolding while the same is in a slippery condition from being wet or covered with ice or snow.

In carrying out our invention, therefore, we provide a structure of a comparatively inexpensive character which furnishes all the protection needed during the construction of the ship and also facilitates the handling of material employed in such construction and enables the ship to be prepared for launching much more readily than is now possible. The structure consists, essentially, of a row of columns or posts 1 of sufficient dimensions to support cantaliver-trusses 2, which project laterally from these posts or columns and carry a roof 3 of an extent sufficient to cover the area occupied by the ship and its surrounding scaffolding, these cantaliver-trusses being securely anchored to the vertical columns or posts, so that they may be supported by the latter even when their overhanging portions are deprived of any outer support. Preferably these cantaliver-trusses project from opposite sides of the supporting posts or columns, as shown in Fig. 1, so as to constitute a structure for covering vessels in course of construction on each side of the row of posts, although the trusses may project from the posts or columns on but one side where but a single vessel is being built—as shown, for instance, in Fig. 5.

To complete the inclosure of the space in which the construction of the vessel or vessels is being carried on, we provide a movable or removable inclosure extending from the outer portion of each overhanging roof-truss to the ground or as close to the latter as may be desired, this outer inclosure being of a character to resist vertical tension and preferably, also, of such character as to resist vertical compression, so that it will prevent lifting of the outer portion of the roof-trusses by the action of the wind or by the preponderance of weight on the oppositely-projecting trusses, and will also prevent the deflection of the outer end of the roof-trusses when the same are subjected to a downward pull or strain tending to cause such deflection.

The preferable form of outer inclosure is a series of longitudinally-sliding doors 4, which are mounted upon rollers 5, running upon rails 6 upon a suitable foundation, the upper portions of these doors being provided with rollers 7, which run in grooved ways 8, preferably formed by channel-bars depending from the outer portion of the roof-truss. The upper portion of each door also has a projecting flange 9, adapted to engage with a flange at the lower end of a depending web 10, and at the bottom of each of the sliding doors is a flange 11, engaging with a flanged rail or beam 12. Hence these doors by their resistance to vertical crushing pressure prevent any deflection of the outer ends of the roof-trusses, while, owing to the fact that they are vertically confined at their lower ends and engage suitable projections on the roof-trusses at the upper ends, they also prevent any tendency which the roof-trusses might otherwise have to rise at the outer ends either by upward pressure from beneath or because of any overturning tendency due to preponderance of weight on one side of the row of supporting posts or columns 1.

In order that the doors 4 may provide the proper rigid vertical support for the projecting portions of the roof-trusses, there should be no lost motion in a vertical direction when the doors are adjusted so as to complete the inclosure, while on the other hand a slight looseness of fit is desirable when the doors are being moved to and fro in order that such movement may be effected with the least effort. We therefore propose to introduce beneath each door when the same has been properly adjusted longitudinally to complete the inclosure some means whereby rigid vertical support for the door can be provided and the door lifted slightly, so as to give it a firm bearing upon the under sides of the roof-trusses overhanging it. For this purpose wedges, jack-screws, or other equivalent means may be employed, jack-screws, such as shown at 13 in Fig. 4, being preferred.

The sliding doors are preferably composed of frames having in the upper portion glazed sashes and in the lower portion solid panels, as shown in Fig. 4, both sashes and panels being by preference so constructed as to be removable.

In Fig. 2 we have shown the sliding doors at one side of the structure projected so as to complete the inclosure, while those on the other side of the structure are retracted in order to permit of the launching of the vessel sidewise. When, however, the conditions are such that sidewise launching will not have to be resorted to, this retraction of the doors constituting the outer inclosure will not be necessary.

Various other forms of outer inclosure, removable or otherwise, may be adopted within the scope of our invention. For instance, in Fig. 6 we have shown a roof-truss provided with a depending structure 14, supported by posts 15, properly secured to said depending structure and to a suitable foundation, these posts being preferably provided with jack-screws 13 or other means whereby they are caused to provide rigid vertical support for the roof-truss, the connections between the posts and foundation being such that the posts can be readily removed when their removal is desired. Detachably secured to the posts 15 are a series of stringers or girths 16, to which may be fastened a depending tarpaulin 17 or other readily-removable covering. In this case a permanent sash 18 by preference constitutes the upper portion of the inclosure.

In Fig. 7 we have shown still another form of side inclosure consisting of a rope or cable 19, suitably secured at its opposite ends, respectively, to the depending structure 14 and to the foundation, this rope being provided with a screw turnbuckle 20 or other equivalent means of imparting tension to it and serving also as a support for the tarpaulin 17 or other side covering.

The posts 1 and the depending structures at the outer ends of the roof-trusses 2 carry rails 21, upon which is mounted the bridge 22 of a traveling crane, which provides for the convenient handling of the material used in the construction of the vessel and for other work about the yard. When the crane is used, the outer inclosures perform the additional function of anchorages or supports for the outer rails or runways of such crane, thus preventing the tendency to overturn the structure which might result from a heavy load at the outer end of the bridge of the crane.

Having thus described our invention, we claim and desire to secure by Letters Patent—

1. The combination of a row of posts or columns with cantaliver roof-trusses projecting laterally therefrom, and an outer structure presenting resistance to vertical tension and serving to anchor the projecting portions of said roof-trusses, substantially as specified.

2. The combination of a row of posts or columns with cantaliver roof-trusses projecting laterally therefrom, and an outer structure serving to support or anchor the outer ends of the projecting roof-trusses, said outer structure being movable, substantially as specified.

3. The combination of a row of posts or columns with cantaliver roof-trusses projecting laterally therefrom, and sliding doors guided on the outer projecting portions of the roof-trusses and on a suitable foundation, and movable so as to open or close the outer side of the structure, substantially as specified.

4. The combination of a row of posts or columns, cantaliver roof-trusses projecting laterally therefrom, sliding doors movable so as to open or close the outer portion of the structure, and means for effecting vertical confinement of said doors to the outer ends of the roof-trusses and to the foundation, substantially as specified.

5. The combination of a row of posts or columns having cantaliver roof-trusses projecting laterally therefrom, with an outer inclosure extending between the said roof-trusses and the foundation, and with means for vertically adjusting said outer inclosure whereby it is caused to anchor or rigidly support the outer portions of the roof-trusses, substantially as specified.

6. The combination of a row of posts or columns, with cantaliver roof-trusses projecting laterally therefrom, sliding doors movable so as to open and close the outer structure, said doors being flanged at top and bottom and flanged guides on the roof-trusses and foundation for engaging with said flanged portions of the doors, substantially as specified.

7. The combination of a row of posts or columns, cantaliver roof-trusses projecting laterally therefrom, and guides or runways mounted upon said structure and serving as a support for the bridge of a traveling crane, substantially as specified.

In testimony whereof we signed our names to this specification in the presence of subscribing witnesses.

W. IRVING BABCOCK.
SAMUEL T. WELLMAN.
CHARLES H. WELLMAN.
JOHN W. SEAVER.

Witnesses to signature of W. I. Babcock:
S. E. GEER,
C. GEO. WERNER.

Witnesses to signatures of Wellman, Wellman, and Seaver:
C. W. COMSTOCK,
JOHN MCGEORGE.